US010413968B2

(12) United States Patent
Pialot et al.

(10) Patent No.: US 10,413,968 B2
(45) Date of Patent: Sep. 17, 2019

(54) MACHINE AND METHOD FOR POWDER-BASED ADDITIVE MANUFACTURING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Frederic Pialot, Clermont-Ferrand (FR); Miguel Torres-Catellano, Clermont-Ferrand (FR); Gilles Walrand, Clermont-Ferrand (FR); Benoit Pourcher, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 372 days.

(21) Appl. No.: 14/418,644

(22) PCT Filed: Jul. 31, 2013

(86) PCT No.: PCT/EP2013/066130
§ 371 (c)(1),
(2) Date: Jan. 30, 2015

(87) PCT Pub. No.: WO2014/020085
PCT Pub. Date: Feb. 6, 2014

(65) Prior Publication Data
US 2015/0202687 A1    Jul. 23, 2015

(30) Foreign Application Priority Data

Jul. 31, 2012  (FR) ..................................... 12 57415

(51) Int. Cl.
*B22F 3/105* (2006.01)
*B33Y 10/00* (2015.01)
(Continued)

(52) U.S. Cl.
CPC ............ *B22F 3/1055* (2013.01); *B22F 3/003* (2013.01); *B23K 15/0086* (2013.01);
(Continued)

(58) Field of Classification Search
CPC ................................ B33Y 10/00; B33Y 30/00
See application file for complete search history.

(56) References Cited

U.S. PATENT DOCUMENTS 5,354,414 A    10/1994  Feygin
5,387,380 A *   2/1995  Cima ..................... B05C 19/04
                                                      264/109
(Continued)

FOREIGN PATENT DOCUMENTS

DE        20318721 U1    4/2005
DE      102006032025     2/2007
(Continued)

OTHER PUBLICATIONS

Yang, R. et al. "Design and characterization of a low-profile micropositioning stage" Precision Engineering (1996). 18. p. 20-29.*
(Continued)

*Primary Examiner* — Colleen P Dunn
*Assistant Examiner* — Nicholas A Wang
(74) *Attorney, Agent, or Firm* — Dickinson Wright PLLC

(57) ABSTRACT

The machine presents a working zone that is defined in an upper part of a build sleeve which is fixedly mounted in a chassis. Within the working zone, the object is supported by a build plate which slides inside the build sleeve when driven in vertical translation by the head of an actuating cylinder which is placed along a central axis of the sleeve.

(Continued)

The build plate is positioned inside a transport container which is arranged removably between the sleeve and the actuating cylinder. The machine also includes a means for moving the transport container vertically into contact with the build sleeve. The container is open at its top and at its bottom so that, when the actuating cylinder is actuated, the head thereof can transfer the plate between the transport container and the build sleeve which forms a build envelope around the plate.

14 Claims, 5 Drawing Sheets

(51) Int. Cl.
    *B33Y 30/00*         (2015.01)
    *B22F 3/00*          (2006.01)
    *B23K 15/00*        (2006.01)
    *B28B 1/00*         (2006.01)
    *B23K 26/342*      (2014.01)
    *B29C 64/153*      (2017.01)
    *B29C 64/20*       (2017.01)

(52) U.S. Cl.
    CPC ............ *B23K 26/342* (2015.10); *B28B 1/001* (2013.01); *B29C 64/153* (2017.08); *B29C 64/20* (2017.08); *B33Y 10/00* (2014.12); *B33Y 30/00* (2014.12); *B22F 2003/1056* (2013.01); *B22F 2003/1058* (2013.01); *Y02P 10/295* (2015.11)

(56) References Cited

U.S. PATENT DOCUMENTS

| | | | |
|---|---|---|---|
| 6,554,600 B1* | 4/2003 | Hofmann ............... | B29C 64/153 264/497 |
| 6,824,714 B1* | 11/2004 | Turck ................... | B29C 67/0077 264/308 |
| 7,204,684 B2 | 4/2007 | Ederer et al. | |
| 2004/0026418 A1 | 2/2004 | Ederer et al. | |
| 2007/0003244 A1 | 1/2007 | Taira et al. | |
| 2007/0026099 A1* | 2/2007 | Hagiwara ............... | B22F 3/004 425/174.4 |
| 2007/0057412 A1* | 3/2007 | Weiskopf ............ | B29C 67/0077 264/497 |
| 2008/0190905 A1 | 8/2008 | Heinlein | |
| 2011/0293771 A1 | 12/2011 | Oberhofer et al. | |
| 2012/0090734 A1 | 4/2012 | Heinlein | |
| 2012/0119399 A1* | 5/2012 | Fruth ................... | B29C 67/0085 264/39 |
| 2013/0064707 A1* | 3/2013 | Matsui ................ | B29C 67/0081 419/61 |

FOREIGN PATENT DOCUMENTS

| | | |
|---|---|---|
| DE | 102007014968 A1 | 10/2008 |
| DE | 102009015130 A1 | 10/2010 |
| DE | 102010020416 A1 | 11/2011 |
| EP | 1704989 A2 | 9/2006 |
| WO | 2007003244 A1 | 1/2007 |

OTHER PUBLICATIONS

International Search Report for PCT/EP2013/066130 dated Feb. 19, 2013.

* cited by examiner

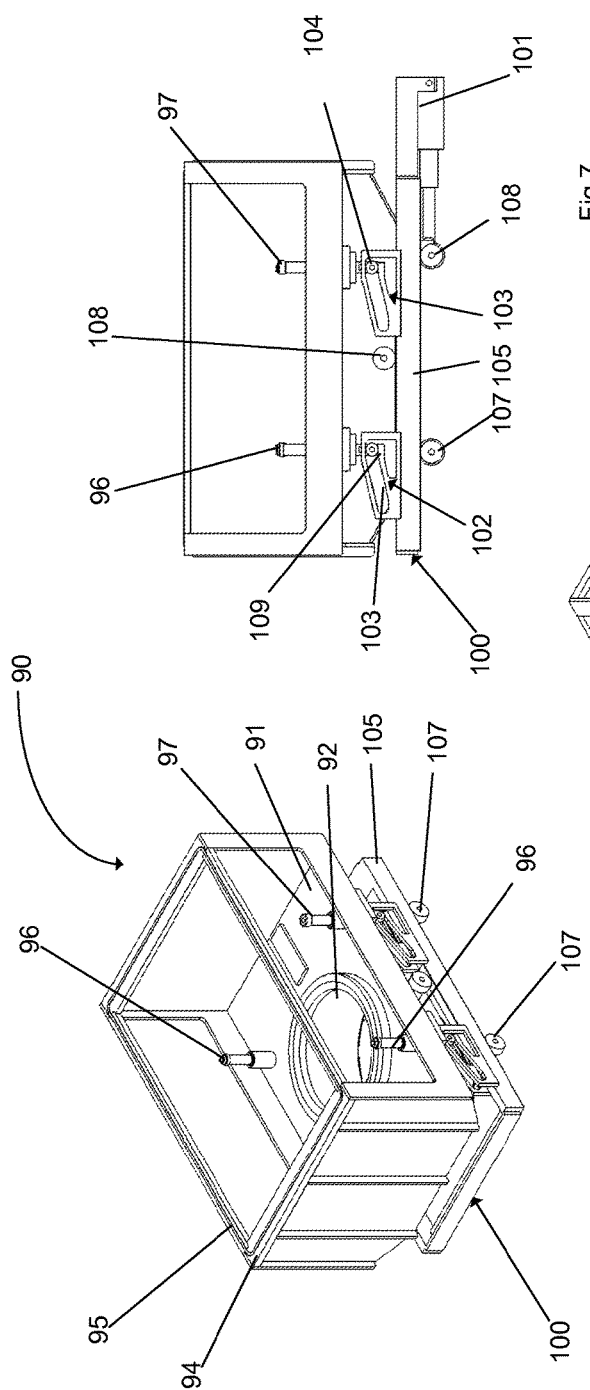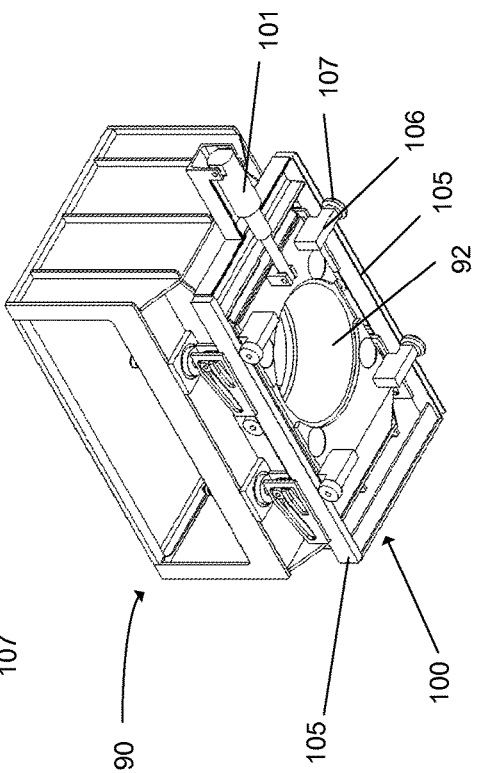

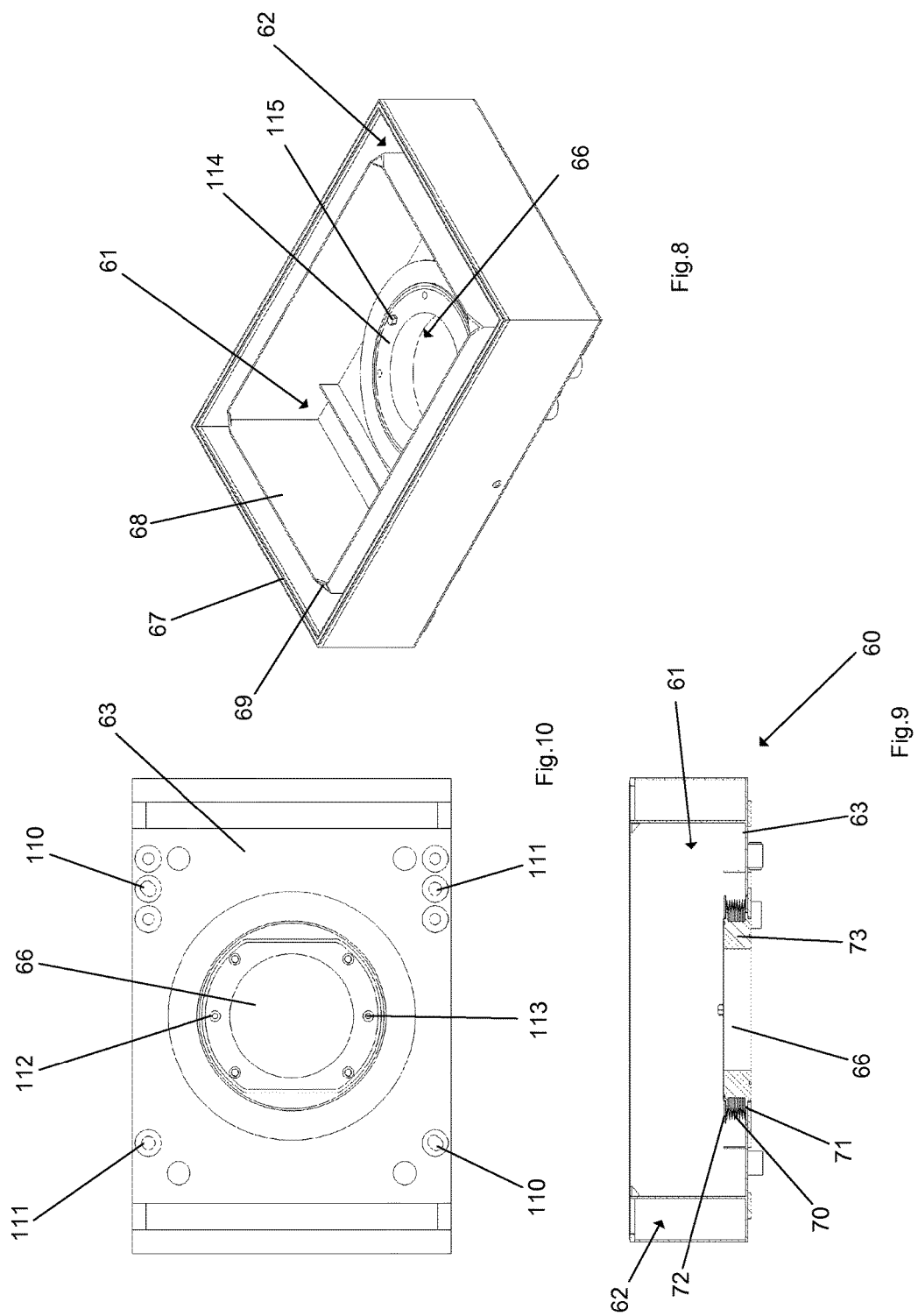

MACHINE AND METHOD FOR POWDER-BASED ADDITIVE MANUFACTURING

This application is a 371 national phase entry of PCT/EP2013/066130, filed 31 Jul. 2013, which claims benefit of French Patent Application No. 1257415, filed 31 Jul. 2012, the entire contents of which is incorporated herein by reference for all purposes.

BACKGROUND

1. Field

The disclosure relates to machines and methods used in powder-based additive manufacturing by sintering or melting particles of the said powder using a beam of energy, such as an electromagnetic radiation (for example a laser beam), or a beam of particles (for example an electron beam). Such a powder-based additive manufacturing method leads to a successive, layer by layer, consolidation, using a beam of energy or particles, of the selected zones of a stratum of pulverulent material, the consolidated zones corresponding to successive sections of the three-dimensional object.

More specifically, the disclosure relates to the means and methods used for transferring a three-dimensional object between an additive manufacturing workstation and a workstation for the removal of the manufactured object, more particular of the type employing an interchangeable container in which the manufactured object is situated.

2. Description of Related Art

Document WO 90/03893 describes a machine for the manufacture of a three-dimensional object by successive, layer by layer, consolidation, using a laser beam, of a pulverulent material, which uses a mobile container. The container contains the object-support plate and means for driving the vertical translational movement thereof. The container is moved along horizontal rails between the workstations for the deposition, the spreading and the compression of the powder, and the workstation at which the prepared layer of powder is treated with the laser beam. The disadvantages of this solution are connected with the fact that the object is manufactured inside a container which additionally contains the drive means, which means that it is heavier, bulkier and therefore more difficult and more expensive to transport. On top of that, this container needs to be positioned very precisely facing each workstation of the machine, because if it is not, there is a risk that errors in the geometry of the manufactured object will appear.

Document U.S. Pat. No. 6,554,600-B1 discloses another example of a machine allowing the manufacture of a three-dimensional object by sintering powder using a laser beam. This machine comprises a build space within which is arranged an interchangeable container comprising a build envelope and a platform for supporting the object that is to be manufactured. The object that is to be manufactured is built inside the container which is then removed from the build space at the end of the operation. In an alternative form, the container, in addition to containing the platform and the object that is to be manufactured, contains a mechanism for the support and translational movement of the platform. The disadvantages with this configuration are the substantial bulk and weight of the container that is to be transported. In another alternative form, the rear wall of the container comprises vertical slots through which means of attachment of the platform to a lateral arm that actuates the vertical translation thereof fit and slide. The disadvantage with this configuration is that it calls for the plate to be actuated in cantilever fashion, which places a great deal of stress on the actuating arm, particularly when the powder is being compressed or when components of large dimensions are being built. Moreover, complex sealing means need to be arranged at the vertical slots in order to prevent powder from escaping out of the container. On top of that, detaching the platform from the container and mounting a new platform are operations that are fairly tricky, as the platform needs to be positioned very precisely with respect to this container.

Document U.S. Pat. No. 7,204,684-B2 has proposed a solution in which the platform that bears the object that is to be manufactured is mounted via a support frame inside an interchangeable container. The platform is moved vertically driven by the hooks of an actuating device situated outside of the container and which comes into contact with the platform by passing through vertical channels made in the lateral walls of the container. In order to prevent powder from the container from contaminating the space outside the container, staged sealing means are provided at the periphery of the support frame. The frame thus comprises a metal blade surmounted by a felt seal that seals at each vertical channel. Leaving aside the fact that it is actuated by a cantilever system as in the preceding document, this configuration has a further disadvantage regarding the friction caused by such an enhanced sealing system that increases the thrust load of the platform actuating device.

Document U.S. Pat. No. 6,824,714-B1 describes another configuration for a machine for the additive manufacture of a powder-based object using laser sintering, the machine comprising a mobile container which is brought into the working zone by a chain conveyor. The container forms a build envelope for the object and contains the platform that supports the object. Because it forms the build space for the object, the container needs to be produced with great precision. The machine moreover comprises means of coupling between the mobile container and a tank of the working zone, and between a vertical actuator independent of the container and the support platform. In order to allow the container to be positioned correctly within the working zone of the machine, these coupling means call for precision mechanisms which can operate only if there is very good sealing between the container and the plate. This is because if powder particles contaminate the container and plate locking mechanisms, these mechanisms would become inoperative.

One problem that the various proposals have in common is the need for a high degree of precision in the creation of the interchangeable container. This is because since the object is produced actually within the container, this container requires very tight manufacturing and assembly tolerances, thereby increasing the cost of manufacturing it.

An additional problem is that of the fouling of the machine by powder particles when an object is being manufactured. One solution has been proposed in the above-mentioned document WO 90/03893, notably because the machine incorporates an extraction device that sucks up powder residue that remains after the layer of powder distributed over the working zone has been compacted. However, such extraction performed prior to the melting carries the risk of dislodging particles from the layer of powder already prepared and increases the time taken to manufacture the object.

Elsewhere, document DE 10 2006 032 025 describes a powder-based additive manufacturing machine in which the frame that forms the build space of the object within the chassis of the machine can be reduced to the dimensions of an object smaller than initially anticipated by mounting a build sleeve on the chassis and combining with it pistons of corresponding size. That document does not describe a mobile container for transporting the object, and, as a result, the operations of loading and unloading the object are laborious.

Another solution for modifying the work space is described in document DE 10 2010 020 416 and, in the absence of a mobile container for transporting the object, it presents the same disadvantages as the preceding document.

Documents WO 2007/003244 and DE 10 2009 015 130 themselves describe mobile containers that allow the transport of the object which has been manufactured in a powder-based additive manufacturing machine. The container forms a build envelope for the object that is to be manufactured and, as a result, the container needs to be produced very accurately, with very tight tolerances. In addition, the container contains the means for the vertical movement of the build plate of the object, making transport operations less easy.

SUMMARY

It is therefore an objective of embodiments of the invention to alleviate at least one of the disadvantages described hereinabove and to propose a machine and a method for powder-based additive manufacture of a three-dimensional object using a beam of energy that allows the work space of the machine to be loaded and unloaded easily, while at the same time allowing a three-dimensional object to be manufactured with a high degree of precision at a lower cost of manufacture.

These objectives are achieved with a machine for the additive manufacture of a three-dimensional object by sintering or melting powder using a beam of energy acting on a layer of powder in a working zone, the said working zone being defined in the upper part of a build sleeve fixedly mounted in a chassis, in which sleeve the said object is manufactured, the said object being supported by a build plate which slides inside the said build sleeve when driven in vertical translation by the head of an actuating cylinder placed along the central axis of the said sleeve, the said machine being characterized in that the said build plate is positioned inside a transport container which is arranged removably between the said sleeve and the said actuating cylinder, in that the machine comprises means for moving the transport container vertically into contact with the build sleeve and in that the container is open at its top and at its bottom so that, when the actuating cylinder is actuated, the head thereof can transfer the said plate between the said transport container and the said build sleeve which forms a build envelope around the said plate.

The machine of an embodiment of the invention therefore comprises a build sleeve the lateral walls of which define a build envelope inside which the three-dimensional object is manufactured by progressively moving the build plate inside the sleeve as the layers of powder successively arranged on the plate solidify and until such a point as the object is obtained. The machine also comprises a transport container containing the build plate which, at the start of the manufacturing operation, allows an empty plate to be brought into and installed within the machine, and allows the manufactured object and its plate to be transported out of the machine at the end of the manufacturing operation. The machine also comprises means of moving the transport container vertically into contact with the sleeve. The container can thus be inserted easily under the sleeve and, once the container is in place, can easily be pressed firmly against the build sleeve of the machine so that the powder can thus be confined to inside the container.

According to an embodiment of the invention also, the said transport container is mounted removably between the said build sleeve which is itself fixedly mounted with respect to the chassis of the machine, and an actuating cylinder actuating the vertical translational movement of the build plate and the axis of which is aligned with the central axis of the opening of the build sleeve. What is meant by the central axis of the opening is the axis that passes through the geometric centre of the opening or through the centre of gravity of a plate that is perfectly centred with respect to this opening. Thus, when the container is inserted inside the machine, with the plate correctly positioned with respect to the actuating cylinder, the latter is transferred by the actuating cylinder to inside the build sleeve which has the same frame of reference as the machine. This allows the use of a simplified removable container which merely has the function of transporting the object, the plate and possibly powder, and the manufacturing tolerances on which are not as tight as those on the build sleeve, while at the same time allowing a three-dimensional object to be manufactured to a high degree of precision.

The container and the build sleeve are designed each to accept the manufactured object and, as a result, they preferably each have a height at least equal to that of the manufactured object. More specifically, the sleeve that forms the build envelope is dimensioned in such a way that it can accommodate an object of maximum height Hmax, whereas the container needs to have a depth corresponding to the height of the object Hmax plus the thickness of the plate and that of the residual space between the plate and the bottom of the container.

For preference, the central axis of the actuating-cylinder head is aligned with the central axis of the said sleeve, and indexing means are provided for indexing between the said container and the chassis of the machine and centering means are provided for centering between the plate and the head of the actuating cylinder.

The actuating cylinder and, therefore, the head thereof, are outside the container. The actuating-cylinder head is aligned with the working sleeve, along the frame of reference of the machine. The plate is centered on the actuating-cylinder head and the container itself is indexed with respect to the chassis and, therefore, to the sleeve, making the assembly easier to install and facilitating correct positioning of the plate with respect to the working sleeve.

In an alternative form, the said indexing means comprises push rods belonging to a box fixedly mounted on the chassis collaborating with orifices made in the bottom part of the transport container.

In another alternative form, the said indexing means comprises studs made on the bottom rim of the sleeve and collaborating with openings made on the top rim of the transport container.

Advantageously, the said centering means comprise two diametrically opposite orifices on the bottom face of the plate which collaborate with protuberances situated on the frontal face of the head of the actuating cylinder.

Thus, with just two protuberances, notably one of prismatic shape which constitutes an open centering feature which prevents the plates from rotating about the axis Z (the axis that is vertical to the plane of the plate) and the other, diametrically opposite one, having a cylindrical shape and constituting a full centering feature which prevents translational movements along the axes X and Y (concurrent axes belonging to the plane of the plate), the plate can be perfectly centred with respect to the head of the actuating cylinder.

For preference, the said plate slides freely inside the said sleeve and inside the said container.

What is meant by a plate that can slide freely is a plate that has no peripheral seal in contact with the build sleeve or with the internal chamber of the container. Such an absence of a seal makes it possible to avoid friction against the internal walls of the sleeve and of the container and makes it possible to reduce load at the plate actuating cylinder. What has been found during tests conducted in the laboratory is that, for a sliding clearance that is clearly defined as a function of the size of the powder particles and for a sleeve internal wall surface roughness suited to the particle size of the powder, the piston can slide without the sliding gap becoming blocked with powder particles. What is more, although certain powder particles, including the finest ones, succeed in crossing the gap between the plate and the sleeve, these are collected by the interchangeable container positioned underneath.

Advantageously, the sliding clearance for the sliding of the said plate inside the said transport container is greater than the sliding clearance for the sliding of the said plate inside the said sleeve.

What is meant by sliding clearance is a gap left between the sleeve and the plate on the one hand, and between an internal space of the container (in which space the plate moves) and the plate on the other hand, so as to allow the plate to move. According to the invention, the sliding clearance between the sleeve and the container, preferably measured around the periphery of the plate, or at least at a point at which the two components are closest together, is greater than the same clearance measured between the internal space of the container and the plate (measured on the periphery of the latter or at least at a point at which the two components are closest together). This means that a container can be produced that has a space for accepting the plate that has dimensions larger than those of the central opening of the sleeve, and that manufacture of the container can thus be simplified, the plate needing precision guidance only inside the sleeve.

For preference, the said transport container comprises a sealed flexible bellows arranged between the said plate and the bottom wall of the container.

This offers the advantage of confining the powder within the container and of protecting the machine and its environment against contamination by powder particles, particularly in the absence of a seal at the periphery of the plate.

Advantageously, the said sleeve on its periphery comprises lateral openings which are made to communicate with a container when it is placed underneath.

In order to obtain a layer of powder that is deposited uniformly over the entire surface area of the working zone, the powder is generally spread over a surface area which is more extensive than the surface area of the working zone, and therefore extends a certain distance beyond the periphery of the sleeve of the machine. By making lateral openings in the periphery of the sleeve, excess powder spread can be recovered wholly by the container arranged in a sealed manner underneath the build sleeve. The container of the invention therefore has a function of collecting powder resulting from the operation of manufacturing the object and of transporting it out of the machine with the manufactured object.

For preference, the said transport container comprises an internal chamber for accepting the said build plate, which chamber is surrounded by a peripheral corridor communicating at its top with the said lateral openings.

The container is thus produced in the form of a box with vertical double walls defining a peripheral corridor. This makes it possible to have peripheral powder storage within the container and to reduce the load on the plate actuating means (the load being reacted by the structure of the machine) while at the same time reducing the quantity of powder in the internal chamber of the container, the plate thus being able to descend as far as the bottom of the container. The dimensions (width and height) of the peripheral corridor are determined so that this corridor can store the quantity of powder that has been spread but not melted during the manufacture of the object.

For preference, the said actuating cylinder drives the said build plate via an intermediate plate.

That makes it possible to simplify the construction of the build plate and make it easier to remove from the container, for example by positioning the means of attachment of the bellows on the intermediate plate and in the bottom of the container.

In a preferred alternative form of the invention, the said vertical-movement means comprise a frame actuated in a horizontal translational movement.

Such a frame is advantageously arranged underneath the said container so that the actuating cylinder passes through it. The horizontal translational movement of the frame therefore does not interfere with that of the actuating cylinder, which means that the two actuations and movements (of the actuating cylinder and of the container) can be separated for greater structural simplicity and operational simplicity of the assembly. Thus, by the movement of a single component which is the frame, it is possible to press against one or more points of the container and ensure the vertical translational movement thereof into contact with the sleeve.

In another alternative form of the invention, the said vertical-movement means use part of the stroke of the actuating cylinder in its approach movement performed towards the sleeve.

The invention, in an embodiment, also proposes a method for the additive manufacture of a three-dimensional object by sintering or melting powder using a beam of energy acting on a layer of powder in a working zone of a machine according to an embodiment of the invention, the said working zone being defined in the upper part of a fixed build sleeve in which the said object is manufactured, the said object being supported by a build plate which slides inside the said build sleeve when driven in vertical translation by the head of an actuating cylinder placed along the central axis of the said sleeve, the said method being characterized in that:
  the said plate is positioned inside a transport container and the said transport container is arranged removably between the said sleeve and the said actuating cylinder,
  the transport container is moved vertically until it comes into contact with the build sleeve,
  the said container being open at its top and at its bottom, and in that the said plate is transferred between the said transport container and the said build sleeve which forms a build envelope around the said plate, using the said actuating cylinder.

Advantageously, the method of the invention comprises manufacturing steps successively consisting in:
  bringing the object support plate to the top of the said build sleeve,
  depositing a layer of powder on the said build plate, melting the powder particles using a pre-established melting strategy,
repeating the depositing and melting steps layer by layer while at the same time progressively lowering the said build plate down inside the said build sleeve until the object is obtained,
lowering the build plate to the bottom of the transport container,
moving the actuating cylinder until it is detached from the said build plate,
removing the transport container from the machine.

BRIEF DESCRIPTION OF DRAWINGS

The embodiments of invention will be better understood by virtue of the remainder of the description, which is supported by the following figures:

FIGS. 5 to 7 illustrate, in perspective and side views, one example of the mounting of a container actuator within the machine of an embodiment of the invention;

FIGS. 8 to 10 illustrate a perspective view, a view in longitudinal section and a view from beneath of one embodiment of a container with which the machine of an embodiment of the invention is equipped;

In the various figures, elements that are identical or similar bear the same references. Their structure and function is therefore not systematically re-described.

DETAILED DESCRIPTION OF SPECIFIC EMBODIMENTS

Figure 1:
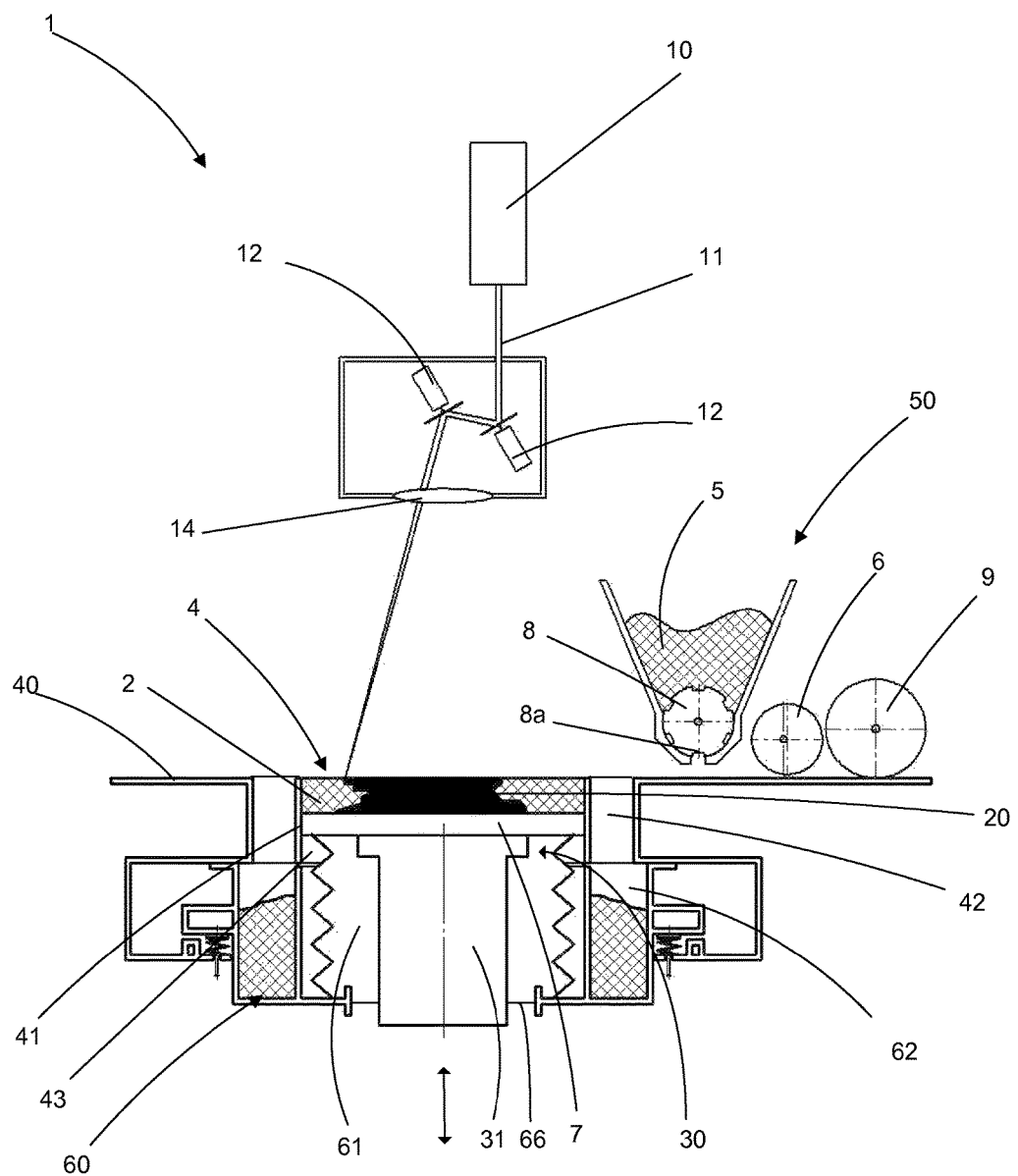
FIG. 1 is a schematic view in cross section of a machine according to an embodiment of the invention.

FIG. 1 schematically depicts one exemplary embodiment of a machine 1 for the additive manufacture of a component 20. As described in the preamble for the application, the invention in actual fact applies to all types of powder-based additive manufacture using the sintering or total melting of the particles of the said powder using a beam of energy such as an electromagnetic radiation (for example a laser beam) or a beam of particles (for example an electron beam).

An energy source, in this instance a laser source 10, emits a laser beam 11 the orientation of which is controlled by galvanometric mirrors 12. An optical lens 14 allows the beam 11 to be focused on the working zone 4 so as to heat the top layer of the powder 2 in a precise pattern and thus selectively cause the powder to melt. After one layer of powder has been treated by the laser beam, the build plate 7 is lowered by a unit thickness (which corresponds to that of a layer of powder) and is covered with a new layer of powder, and so on, in order, layer after layer, to form the component 20. Depending on the type of energy beam and powders used, the thickness of a layer of powder may vary from a few micrometres (for example 10 μm) to several hundreds of micrometres (for example 500 μm=0.5 mm). When the component 20 is finished, namely when all the layers necessary for building it have been successively solidified, the component is removed from the working zone.

The machine 1 also comprises a layering device 50 that allows a new layer of powder to be applied to the working zone 4. The layering device 50 of FIG. 1 comprises a feed hopper 5 and a spreader roller 6 for spreading the powder 2 over the working zone 4. The feed hopper 5 at its lower part comprises a metering roller 8 comprising grooves 8a the purpose of which is to transfer a precise quantity or dose of powder 2 from the hopper 5 to the spreader roller 6. The layering device 50 further comprises a compacting roller 9. The final thickness of the layer of powder is therefore the result of two successive operations. A first thickness is defined by the spreader roller 6, this thickness then being reduced and made even more uniform by the action of the compacting roller 9. The compacting roller 9 moves with the feed hopper 5 and the spreader roller 6. The feed hopper 5, the spreader roller 6 and the compacting roller 9 are carried by one or more carriages which are able to move between the powder-storage means (not depicted) and the working zone 4.

The working zone 4 is delimited within a fixed chassis 40 of the machine 1 by a sleeve 41 inside which the build plate 7 slides, this build plate being driven in vertical translation by an actuating cylinder 31 as indicated by the double-headed arrow in FIG. 1. The sleeve 41 is secured to the chassis 40, being fixedly mounted on the chassis 40 or produced as one piece therewith. The sleeve 41 has a cross section of circular, square or rectangular shape, or any other suitable shape, and is situated within the chassis 40 facing the zone of action of the laser source 10. The sleeve 41 comprises a central opening 43 for the passage of the plate 7 and lateral passages or openings 42. The lateral openings 42 are made in the periphery of the sleeve 41, over the entire height thereof, so as to allow excess powder 2 during the layering to be removed. The plate 7 has a cross section of the same shape as the sleeve 41 and dimensions similar thereto inside which it slides with a clearance j1. The plate 7 forms a support for the three-dimensional object that will be built. The sleeve 41 constitutes the build envelope of the object and has a height at least equal to that of the three-dimensional object that is to be built, plus the thickness of the plate 7.

Figure 2:
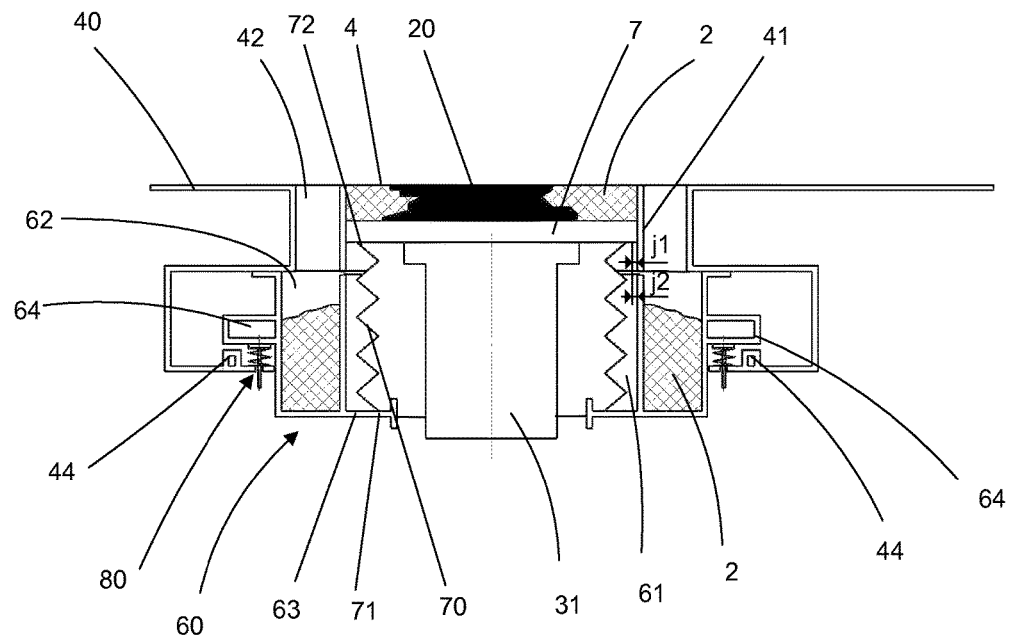
FIG. 2 is a schematic view in cross section of the container with which the machine of an embodiment of the invention is equipped, in the work position during the manufacture of the object.
Figure 4:
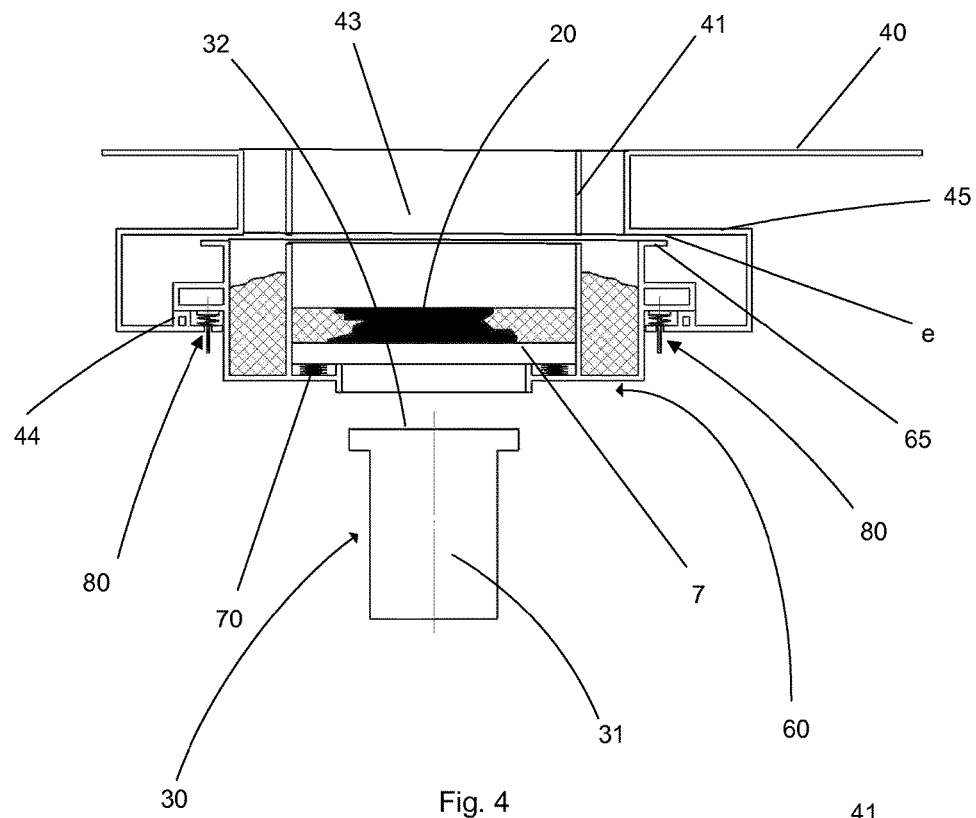
FIG. 4 is a schematic view in cross section of the container with which the machine of an embodiment of the invention is equipped at the end of the object-manufacturing operation, the container being detached from the chassis of the machine and the actuating cylinder being retracted.

The actuating cylinder 31 belongs to a translational-movement assembly 30. What is meant by an actuating cylinder is a lifting device, for example of the pantograph type or, for preference, of the type comprising a tubular body inside which there moves in a translational manner a rigid rod allowing the transmission of a movement and a speed at its end. The actuating cylinder 31 may be of hydraulic, pneumatic or electric type. In a preferred alternative form of embodiment of the invention, use is made of an electric actuating cylinder, by which the movement of the rod can be controlled very precisely. The translational-movement assembly 30 comprises an external box secured to the chassis 40 of the machine and means (not depicted in the drawings) for guiding the translational movement of the actuating cylinder 31. The actuating cylinder 31 is guided in translational movement inside the external box of the assembly 30 between a raised position (FIG. 2) and a lowered position (FIG. 4), the head 32 of the actuating cylinder 31 being intended to engage with the plate 7 (see FIG. 4). To simplify the drawings and make them clearer, the various components of the assembly 30 have been omitted, except for the actuating cylinder 30 the vertical movement of which allows for a better description of an embodiment of the invention.

According to an embodiment of the invention, the machine 1 comprises a transport container 60, inside which the plate 7 is arranged, the container being arranged underneath the sleeve 41 and open at the top and at the bottom so that the head 32 of the actuating cylinder 31 can transfer the plate 7 between the transport container 60 and the sleeve 41. The transport container 60 is installed within the chassis 40 under the sleeve 41, for example by sliding it along horizontal rails of the latter. In an embodiment depicted in FIG. 2, the transport container 60 comprises lateral bearing fins 64 which slide along the horizontal rails 44 of the chassis 40 until they come fully into abutment, allowing precise positioning facing the sleeve 41. The transport container 60 is then pushed vertically upwards to be pressed firmly against the sleeve 41, by spring-loaded push rods 81 (see FIG. 3), and is then kept in this position using the locking device 80 that comprises means holding the push rods 81 in position. The peripheral rim of the transport container 60 comprises a seal which is pressed firmly against the opposing face of the sleeve 41 so as to prevent any powder leaving the transport container 60.

The transport container 60 comprises an internal chamber 61 in which the plate 7 moves in vertical translation under the action of the actuating cylinder 31. The cross section of the internal chamber 61 has a shape and dimensions similar to those of the plate 7, the clearance between the external periphery of the plate 7 and the walls of the internal chamber 61 being j2, with j2>j1. As can be seen better in FIGS. 2 and 9, the transport container 60 is produced in the form of a box with vertical double walls, the internal chamber 61 being surrounded by a peripheral corridor 62 and being separated therefrom by vertical walls 68. The peripheral corridor 62 is open at its top to communicate with the openings 42 of the chassis 40 and is closed at its bottom so as to be able to store the powder 2. The corners of the vertical walls 68 are bevelled so as better to guide the powder towards the peripheral corridor 62 (the plate 7 in this case having rounded or bevelled corners). The cross section of the peripheral corridor 62 is greater than that of a corresponding opening 42, the peripheral corridor 62 being dimensioned so as to be able to store all of the quantity of powder recovered during the various successive layerings required to manufacture the component 20. The transport container 60 comprises a peripheral seal 67 to seal frontally with the sleeve 41 (see FIG. 8).

According to one advantageous aspect of the invention, the build plate 7 slides freely inside the sleeve 41, no seal being provided on the periphery of the plate between the latter and the sleeve 41. This is because it has been found during tests performed in a laboratory that, for certain sleeve and plate roughness values and for certain values of the clearance between these components, powder particles from the working zone do not block the gap between the internal walls of the build sleeve 41 but allow the plate 7 to slide. Moreover, in order to guarantee correct confinement of the powder to inside the transport container 60 and protect the other components of the machine 1, a bellows 70 is arranged in the central part of the transport container 60, the bottom end 71 of the bellows 70 being fixed to the bottom wall 63 of the internal chamber 61, and the top end 72 to the bottom face of the plate 7 (see FIG. 9).

In a preferred embodiment of the invention, as visible in FIGS. 5 to 7, the machine 1 comprises a support box 90 fixed on the chassis 40 of the machine and into which the removable or mobile transport container 60 is introduced. The box 90 is of parallelepipedal overall shape and comprises a bottom wall 91, a central circular passage 92 through which allows the passage of the actuating cylinder 31, closed lateral walls, at least one of which is able to open to allow the transport container 60 to pass, and a top rim 94 comprising a peripheral seal 95 to seal the box 90 against dust. Projecting through the bottom wall 91 of the box 90 are four push rods 96, 97 the vertical axes of which are positioned in the corners of a rectangle having the same centre as the passage 92. Diagonally opposite push rods are identical, two push rods 96 each have a conically shaped top end and the other two push rods 97 each have a cylindrically shaped top end. The push rods 96, 97 engage with correspondingly shaped orifices made in the transport container 60, as will be explained later on.

The push rods 96, 97 are moved in a vertical translational movement by a frame 100 when it itself is driven in a horizontal translational movement by an actuator 101 (FIGS. 6 and 7). More specifically, the frame 100 is rectangular in shape, the external contour of the frame 100 having dimensions similar to those of the base of the box 90. The frame 100 is fitted with cams 102 along each longitudinal side (FIG. 7). The cams 102 have ramps 103 along which followers 104 mounted at the bottom ends of the push rods 96, 97 run. A cam 102 comprises two parallel ramps 103 each fixed to one lateral face of the side 105. The bottom end of each push rod 96, 97 is fitted with two followers 104 each coming into contact with one ramp 103. The ramp 103 takes the form of a furrow cut into the thickness of the cam and ending in a flexible tab 109. The tab 109 is a flexible beam that makes it possible to absorb differences in thickness between several containers 60, while at the same time guaranteeing that the transport container 60, more particularly the peripheral seal 67 thereof, which is pressed firmly against the sleeve 41, is held sufficiently tightly. In addition, the ramps 103 allow the container to lower progressively when detached from the chassis 40 at the end of the manufacturing operation.

In another alternative form (which has not been depicted), the ramps 103 are rigid, the push rods 96, 97 in that case being provided with height-adjustment means so as to adapt to the height of the container and ensure that the latter is kept pressed firmly against the sleeve 41 of the machine.

Four mounting supports 106 (FIG. 6) for the bottom rollers 107, 107' project outside the bottom wall 91 of the box 90, these bottom rollers being arranged in such a way that two rollers 107, 107' come into contact with the bottom part of each longitudinal side 105 of the frame 100. Two rollers 107 are V-shaped rollers sliding along a V-shaped rail to guide the frame 100 laterally, the other two rollers 107' themselves being flat rollers in contact with a flat rail. A top roller 108 is fixed to the bottom wall 91 of the box 90 in such a way that it presses on the top part of each side 105 of the frame 100 and thus compensates for the play in the assembly of this frame. The frame 100 is thus guided in its horizontal translational movement with respect to the box 90 when driven by the actuator 101. The actuator 101 is advantageously of electric type and is operated in such a way as to lock the transport container 60 when installed inside the box 90.

FIGS. 8 to 10 illustrate one embodiment of a transport container 60 of the invention which can be introduced into the box 90 and collaborate with the push rods 96, 97 thereof. As can be seen better in FIG. 10, the bottom wall 63 is provided with means of connecting the transport container 60 to the push rods 96, 97 of the box 90. Thus, two protuberances which are diametrically opposed with respect to the center of the opening 66 each comprise an orifice of circular shape 111 designed to engage with a conical-end push rod 96 in order to center the transport container 60. Two further protuberances that are diametrically opposed with respect to the centre of the opening 66 each comprise an oblong-shaped orifice 110 designed to engage with a cylindrical-end push rod 97 in order to orientate the transport container 60 with respect to the box 90. When the transport container 60 is installed inside the box 90, the actuator 101 commands the attachment of the transport container 60 which is then pressed firmly against the sleeve 41.

In a preferred alternative form of embodiment of the invention and as illustrated better in FIG. 9, the bellows 70 is held inside the transport container 60 by an intermediate plate 73. The intermediate plate 73 is made to come into contact with the head 32 of the actuating cylinder 31 and with the plate 7 (which is not depicted in FIGS. 8 to 10) and it rests on the bottom of the transport container 60 when the actuating cylinder 31 is in the lowered position. Vertical protuberances for supporting the plate 7 are provided in the bottom of the container so as to prevent the bellows 70 from being crushed.

The plate 7 and, when present, the intermediate plate 73, each comprise centering means 98 of centering one relative to the other and relative to the head 32 of the actuating cylinder 31. Thus, as visible in FIGS. 8 and 10, the intermediate plate 73 comprises two diametrically opposed orifices 112, 113 which collaborate with protuberances situated on the frontal face of the head 32 of the actuating cylinder 31. The frontal face 114 of the intermediate plate is also provided with protuberances identical to those of the head 32 (a first protuberance 115 being visible in FIG. 8, the other being diametrically opposite the first) to collaborate with orifices situated on the bottom face of the plate 7. The protuberance 115 has a prismatic shape and constitutes an open centering feature for preventing the plate from rotating about the axis Z (axis vertical to the plane of the plate), the diametrically opposite protuberance having a cylindrical shape and constitutes a full centering feature which prevents translational movements along the axes X and Y (concurrent axes belonging to the plane of the plate).

Figure 11:
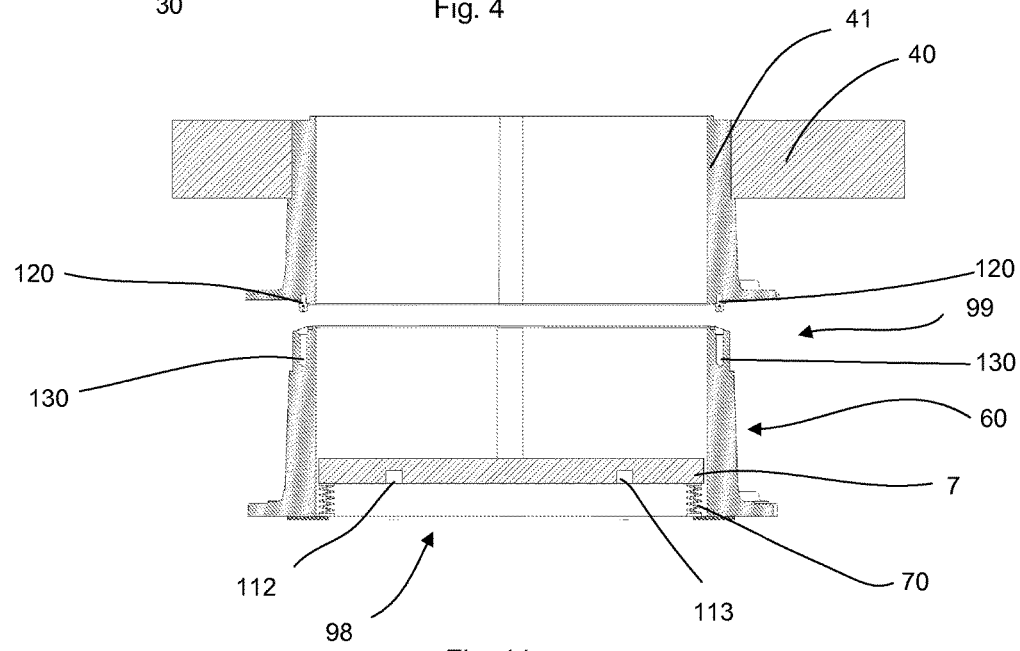
FIG. 11 illustrates, in a cross-sectional view, a container with which the machine of an embodiment of the invention is equipped in an alternative form of embodiment of the invention.

FIG. 11 illustrates an alternative form of embodiment of the invention in a view in section taken on a vertical plane passing through the diagonal of the plate. A working sleeve 41 of rectangular cross section is fixed to the chassis 40 of the machine. The transport container 60 has a parallelepipedal overall shape and is illustrated in the position in which it is introduced into the machine, between the working sleeve 41 and the actuating-cylinder head (which has not been illustrated in this figure). In the bottom of the transport container 60 there are a plate 7 and a bellows 70 which are held by a peripheral support plate and through which the head of the actuating cylinder passes. The machine comprises indexing means 99 that allow the transport container 60 to be orientated relative to the working sleeve 41 during the installation of the container, prior to the start of the operation of manufacturing the object. The indexing means 99 comprise two studs 120 produced on the bottom rim of the working sleeve 41, arranged on the diagonal thereof, which studs collaborate with orifices 130 made on the top rim of the transport container 60. The orifices are deep enough that they can store any powder residue without impeding the guiding of the studs 120. The transport container 60 is moved vertically by movement means (not depicted) and presses in a sealed manner against the bottom rim of the working sleeve 41. By way of example, part of the stroke of the actuating cylinder can be used to move the transport container 60 towards the working sleeve 41. Centering means 98 are also provided, notably two diametrically opposed orifices 112, 113 (situated along the same diagonal of the plate) and collaborate with protuberances provided for that purpose on the frontal face of the head 32 of the actuating cylinder 31. These protuberances are advantageously of the same type as those described with reference to FIGS. 8 to 10.

In operation, to start off with, the machine 1 is supplied with a transport container 60 inside which there is a plate 7 which rests directly on the bottom of the transport container 60 via a bellows 70 or, in an alternative form, on an intermediate plate 73. The transport container 60 also comprises a bellows 70 which is in the compressed state in the bottom of the container. The transport container 60 is arranged underneath the sleeve 41, for example by sliding it along rails 44, into a position of abutment, or by placing it on the push rods 96, 97. The container is in the same position with respect to the sleeve 41 and to the actuating cylinder 31 as the position illustrated in FIG. 4. Thus, the top edge 65 of the transport container 60 is situated underneath the working sleeve 41, at a distance "e" with respect to the facing bottom face 45 of the sleeve. When the transport container 60 is correctly positioned with respect to the chassis of the machine, a locking device 80 that locks the chassis with respect to the sleeve 41 is actuated or, in an alternative form, the frame 100 is given a horizontal translational movement and causes the push rods 96, 97 to effect a vertical translational movement in order to press the transport container 60 firmly against the sleeve 41, the transport container 60 being in the position illustrated in FIG. 3. The transport container 60 is held in this position throughout the manufacturing of the component 20. Once the container has been fixed to the chassis 40, the control means of the machine allow the actuating cylinder 31 to be actuated in an upwards translational movement until its head 32 comes to bear against the bottom face of the plate 7 (or, where present, of the intermediate plate 73).

Figure 3:
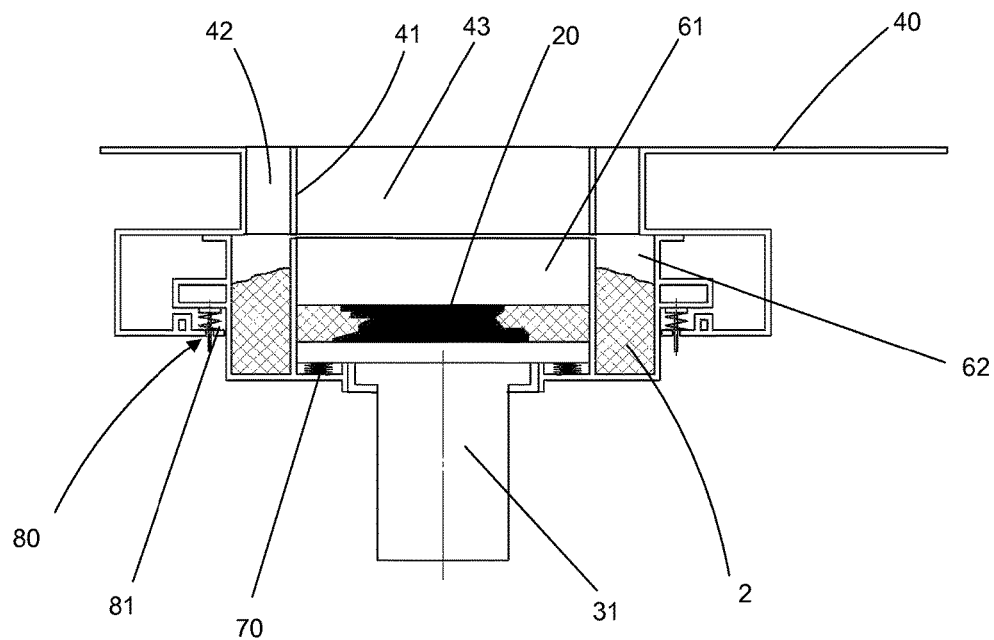
FIG. 3 is a schematic view in cross section of the container with which the machine of an embodiment of the invention is equipped, at the end of the object-manufacturing operation, the container still being fixed to the chassis of the machine.

For preference, the head 32 is immobilized on the plate 7 via vacuum, means being provided for that purpose in the two components (these not being illustrated in the figures). The build plate 7 is pushed upwards by the actuating cylinder 31, controlled by the control means of the machine, through the internal chamber 61 and the build sleeve 41 until it reaches the same level as the top face of this sleeve. The plate 7 is now ready to receive a layer of powder from the layering device 50. The layer of powder deposited is heated by the laser beam and solidified at precise points on its surface, according to the instructions received from a control unit of the machine 1. After the first layer of powder has solidified, the plate is lowered by a distance equivalent to a powder layer thickness, driven by the actuating cylinder 31, so that manufacture can continue with the deposition and solidification of a new layer of powder. At the end of the operation for manufacturing the component 20, the actuating cylinder 31 is lowered and the plate 7 leaves the working sleeve 41, the actuating cylinder continuing its stroke until the plate 7 supporting the manufactured object is at the bottom of the transport container 60, as illustrated in FIG. 3.

The actuating-cylinder head 32 is lowered further and detached from the plate 7. The locking device 80, or the frame 100, are then actuated in order to disconnect the transport container 60 from the chassis 40 as visible in FIG. 4. The transport container 60 can now be removed from the chassis 40 and transported (manually by an operator or preferably automatically using mechanical means such as a chain conveyor, a robot arm, etc.) to another workstation that allows the component 20 and the plate 7 to be recovered from the internal chamber 61 and allows recovery of any powder 2 present in the peripheral corridor 62.

The powder used is preferably a metallic or ceramic powder. The preferred particle size for the powder may vary from a few microns (for example 5 µm) to 300 or 400 µm according to the type of energy beam used and the target final layer thickness.

Other alternative forms and embodiments of the invention may be envisaged without departing from the scope of these claims.

The invention claimed is:

1. A machine for the additive manufacture of a three-dimensional object by sintering or melting powder using a beam of energy acting on a layer of powder comprising:
    a working zone, wherein the working zone is defined in an upper part of a build sleeve in which the three-dimensional object is manufactured, wherein the build sleeve has a height which defines a maximum height for the three-dimensional object to be manufactured such that the entire three-dimensional object remains in the build sleeve during manufacturing;
    a chassis, in which the build sleeve is fixedly mounted;
    a build plate which supports the three-dimensional object, and which slides inside the build sleeve when driven in vertical translation;
    a head of an actuating cylinder placed along the central axis of the build sleeve, and which drives the build plate in vertical translation;
    wherein the build plate is positioned inside a transport container which is made as a separate piece from the sleeve and which is arranged removably below a lower edge of the build sleeve and above the actuating cylinder;
    a raising device that is configured to move the transport container vertically upwardly into contact with the build sleeve; and
    wherein the transport container is open at its top and at its bottom so that, when the actuating cylinder is actuated, the head transfers the plate from the transport container to the build sleeve, which forms a build envelope around the build plate, and so that the head of the actuating cylinder are retractable out of the bottom of the transport container such that the transport container with the build plate and the three-dimensional object can be transported away from the build sleeve and away from the actuating cylinder.

2. The machine according to claim 1, wherein the central axis of the actuating-cylinder head is aligned with the central axis of the build sleeve, and further comprising an indexing means for orienting the transport container relative to the chassis of the machine, and a centering means for centering between the build plate relative to the head of the actuating cylinder.

3. The machine according to claim 2, wherein the raising device comprises push rods belonging to a box fixedly mounted on the chassis and which collaborate with orifices made in the bottom part of the transport container.

4. The machine according to claim 2, wherein the indexing means comprises studs made on a bottom rim of the build sleeve and collaborating with openings made on a top rim of the transport container.

5. The machine according to claim 2, wherein the centering means comprises two diametrically opposite orifices on a bottom face of the build plate which collaborate with protuberances situated on a frontal face of the head of the actuating cylinder.

6. The machine according to claim 1, wherein the build plate slides freely inside the build sleeve and inside the transport container.

7. The machine according to claim 1, wherein a sliding clearance for sliding of the build plate inside the transport container is greater than a sliding clearance for sliding of the build plate inside the build sleeve.

8. The machine according to claim 1, wherein the transport container comprises a sealed flexible bellows arranged between the build plate and its bottom wall.

9. The machine according to claim 1, wherein the build sleeve comprises a periphery having lateral openings outside of the working zone which are made to communicate with a transport container when it is placed underneath.

10. The machine according to claim 9, wherein the transport container comprises an internal chamber for accepting the build plate, which internal chamber is surrounded by a peripheral corridor communicating at its top with the said lateral openings of the build sleeve.

11. The machine according to claim 1, wherein the actuating cylinder drives the build plate via an intermediate plate.

12. The machine according to claim 1, wherein the raising device includes a frame actuated in a horizontal translational movement.

13. A method for the additive manufacture of a three-dimensional object by sintering or melting powder using a beam of energy acting on a layer of powder in a working zone of a machine according to claim 1, wherein the working zone is defined in the upper part
    of the fixed build sleeve in which the object is manufactured, the object being supported by
    a build plate which slides inside the build sleeve when driven in vertical translation by
    the head of the actuating cylinder placed along the central axis of the build sleeve, comprising:
    positioning the plate inside the transport container, which is open at its top and at its bottom;
    removably arranging the transport container between the build sleeve and the actuating cylinder
    vertically moving the transport container until it comes into contact with the build sleeve; and
    transferring the build plate between the transport container and the build sleeve which forms a build envelope around the build plate using the actuating cylinder.

14. The method according to claim 13, comprising successively:
    bringing the build plate to the top of the build sleeve,
    depositing a layer of powder on the build plate,
    melting the powder particles using a pre-established melting strategy,
    repeating the depositing and melting steps layer by layer while at the same time progressively lowering the build plate down inside the build sleeve until the object is obtained,
    lowering the build plate and with the object out of the build sleeve and into the transport container only after the depositing and melting steps are completed, lowering the build plate to the bottom of the transport container, moving the actuating cylinder until it is detached from the build plate, and removing the transport container from the machine with the unmelted and previously melted powder particles inside the transport container.

* * * * *